(No Model.) 3 Sheets—Sheet 1.
O. B. FAHNEHJELM.
INCANDESCENT LIGHT.
No. 312,452. Patented Feb. 17, 1885.
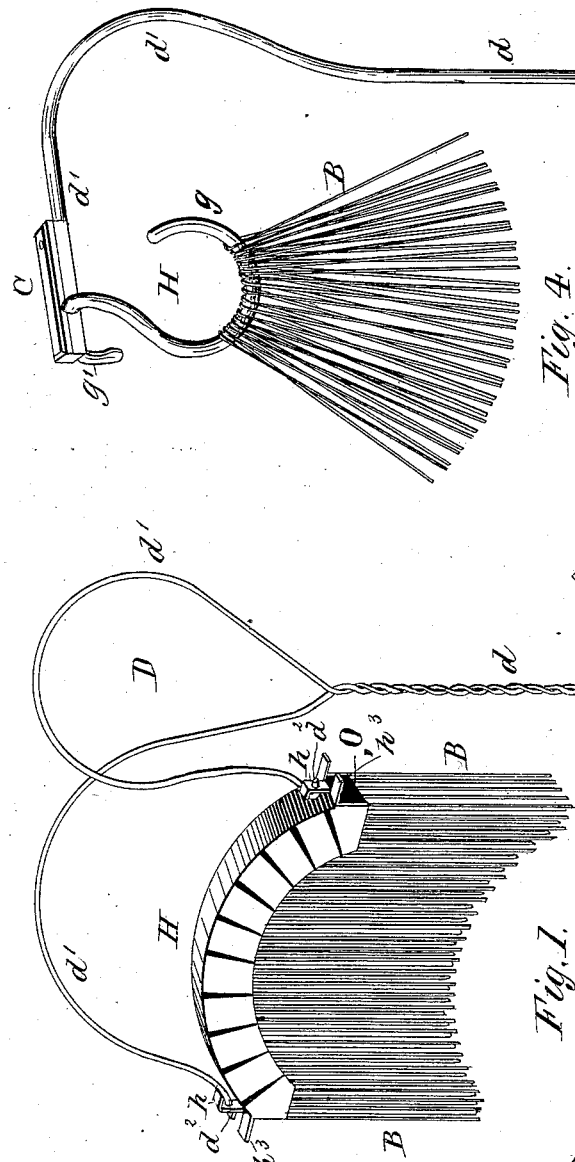
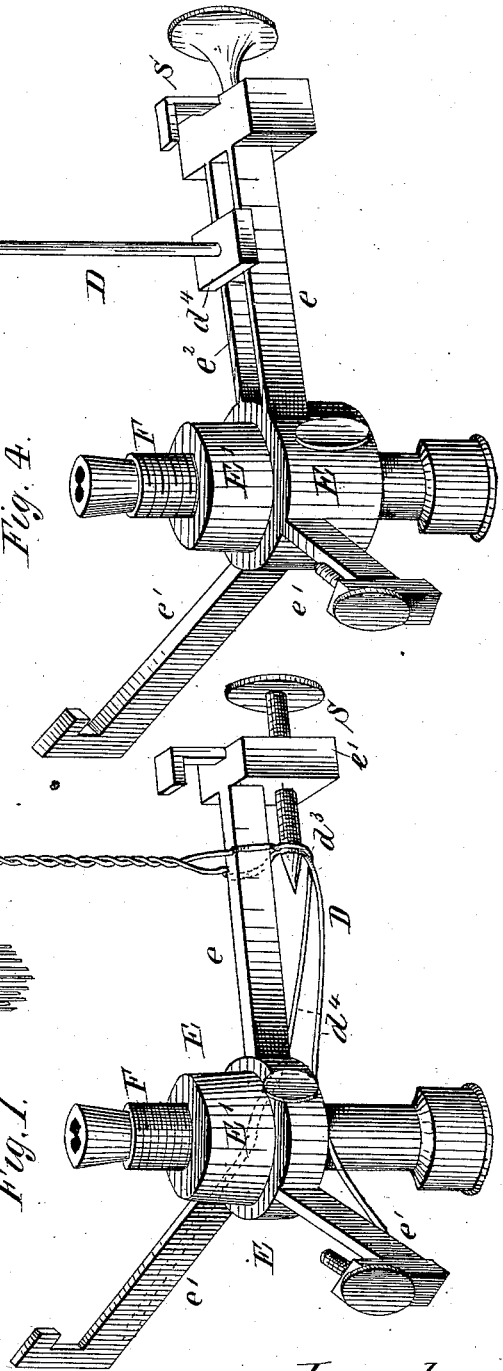
Witnesses
W. E. Soulter.
G. N. Knotts
Inventor
Otto B. Fahnehjelm
pr Henry Orth
his atty.

(No Model.) 3 Sheets—Sheet 3.
O. B. FAHNEHJELM.
INCANDESCENT LIGHT.
No. 312,452. Patented Feb. 17, 1885.
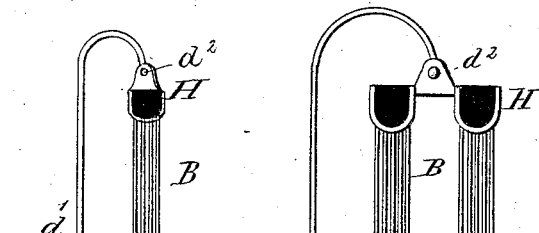
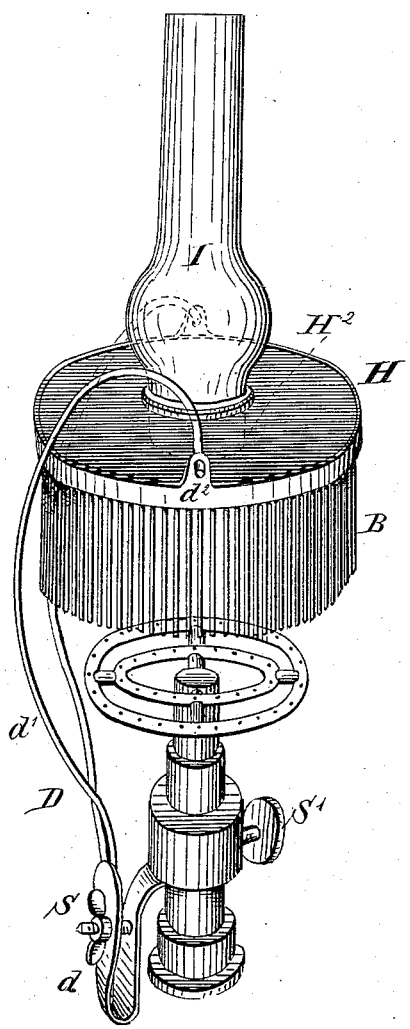
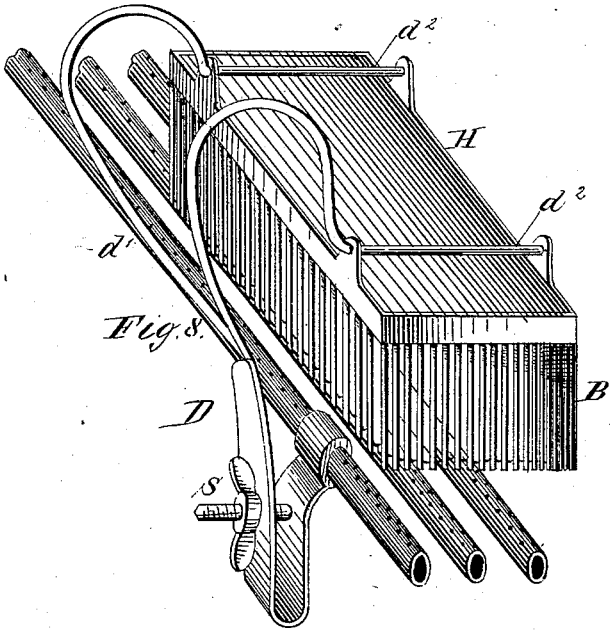
Witnesses.
W. E. Poulter.
Samuel Edmonds.
Inventor
Otto B Fahnehjelm (No Model.) 3 Sheets—Sheet 2.

O. B. FAHNEHJELM.
INCANDESCENT LIGHT.

No. 312,452. Patented Feb. 17, 1885.

Witnesses.
N. E. Coulter
G. H. Knott

Inventor
Otto B. Fahnehjelm
per Henry Orth
his att'y

UNITED STATES PATENT OFFICE.

OTTO BERNHARD FAHNEHJELM, OF STOCKHOLM, SWEDEN.

INCANDESCENT LIGHT.

SPECIFICATION forming part of Letters Patent No. 312,452, dated February 17, 1885.

Application filed August 15, 1884. (No model.) Patented in Germany November 17, 1883; in Belgium November 30, 1883, No. 63,217; in England December 12, 1883, No. 5,646; in Austria-Hungary January 15, 1884; in France February 5, 1884, No. 158,572; in Italy February 10, 1884, No. 16,377, and in Sweden March 20, 1884.

*To all whom it may concern:*

Be it known that I, OTTO B. FAHNEHJELM, a subject of the King of Sweden, residing at Stockholm, in Sweden, have invented certain new and useful Improvements in Supports for Holding and Adjusting Incandescing Bodies in the Flame of a Gas, (for which I have obtained Letters Patent in Great Britain, No. 5,646, dated December 12, 1883; in Belgium, No. 63,217, dated November 30, 1883; in France, No. 158,572, dated February 5, 1884; in Italy, No. 16,377, dated February 10, 1884; in Sweden, dated March 20, 1884, said Swedish patent bearing no number, and for which I have made application for patent in Germany under date of November 17, 1883, and in Austria-Hungary under date of January 15, 1884;) and I do hereby declare the following to be a full, clear, and exact description of the invention.

This invention relates to means more especially adapted for use in the art of lighting by incandescence, and has for its object to provide simple appliances whereby an incandescing body or a series of bodies is or may be held or suspended in an open flame, and whereby said incandescing body may be adjusted vertically and horizontally relatively to said flame.

The invention consists in the combination, with an ordinary or any suitable gas-burner and a shade-holder, of means for holding or suspending an incandescing body or a group of such bodies in the flame of the burner, and for adjusting said body both horizontally and vertically in relation to said flame, substantially as hereinafter fully described, and as shown in the accompanying drawings, in which—

Figure 2:
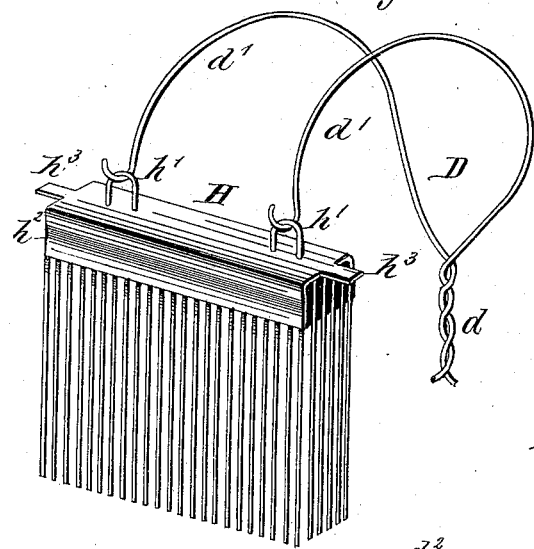
Figure 3:
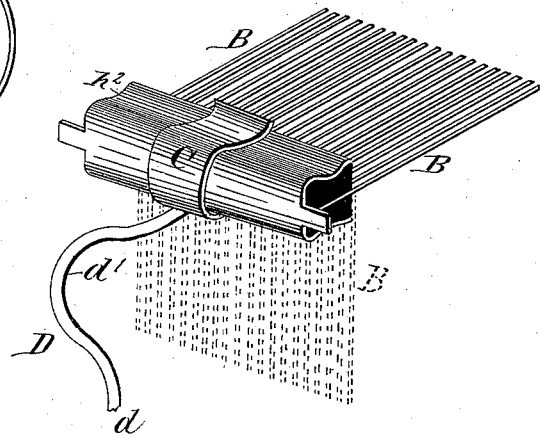
Figure 5:
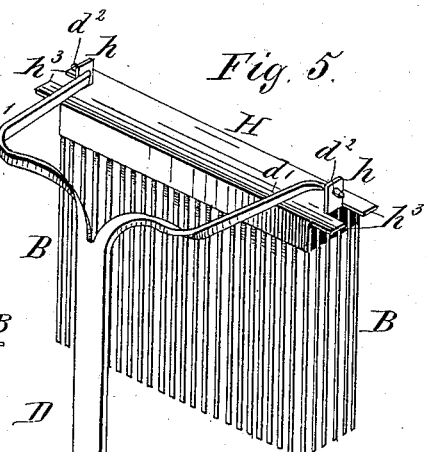
Figure 6:
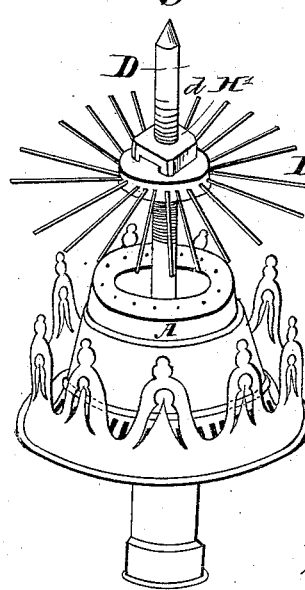

Figure 1 shows in perspective an ordinary fish-tail burner provided with a globe or shade bracket and means for holding the incandescing body within the flame of and adjusting the same relatively to the burner. Figs. 2 and 3 are like views of a modified form of holder for the refractory body. Fig. 4 is also a perspective view similar to Fig. 1, showing another modification in the construction of the holder for the refractory body. Fig. 5 is a like view showing the holder for the refractory body applied to a burner without a shade-support. Fig. 6 shows the application of the holding and adjusting devices to an Argand burner by a like view. Fig. 7 shows in section a slight modification in the means employed for locking the support for the holder in position on the burner pipe or tube, and Fig. 7$^a$ shows a double holder. Figs. 8 and 9 illustrate various forms of holders for the incandescing body and the means for holding or suspending them over the burner and adjusting the said holders relatively to such burners.

In separate applications for patents filed, respectively, December 23, 1883, Serial No. 115,500, and August 4, 1884, Serial No. 139,639, now pending before the United States Patent Office, I have described processes of producing incandescing bodies for illuminating purposes. I have also described processes and means for assembling or grouping a number of such bodies together in a suitable holding device, and as this invention relates, essentially, to the means for holding or suspending such assembled or grouped refractory bodies in or about the flame of a jet of gas, and for adjusting the same relatively to said flame, it will not be necessary to here describe either the mode of producing the incandescing bodies or that of securing them in groups to a suitable holder.

Various means may be employed in carrying out this invention, such means depending, in some measure, on the nature of the burner and conditions of use. It is also desirable to so construct these supporting devices as to adapt them to be readily applied and adjusted without the aid of skilled mechanics, and to so construct these supports as to place them within the means of the general public.

In Fig. 1 and in part in Figs. 2 and 3 I have shown a support, D, made of two wires twisted together to form a standard, as at $d$, and branches or supporting-arms $d'$, the extremities of which are bent at right angles to form lugs or pivots $d^2$. At the lower end the standard $d$ is twisted to form a loop, $d^3$, and from said loop the wires diverge and form brace-arms $d^4$. As shown, this holder is especially adapted for use with a shade-bracket, E, and is adjusted vertically by adjusting the bracket on the burner-pipe F, and when so adjusted securing said bracket by means of a set-screw, S. The lateral adjustment of the support D is effected by means of a set-screw, S, working in the loop $d^3$ of the support D, and in a pendent lug, $e'$, formed on the outer end of the arm $e$ of the bracket E, and in Fig. 3 a single-armed standard is employed that carries at its outer end a spring-clamp, C, in which the holder H is clamped, and said standard may be secured to the shade-bracket in the manner described, or as shown in Fig. 4. The arm $e$ of the shade-bracket E being slotted, as at $e^2$, and the standard being secured to a sliding block, $d^4$, in which takes the adjusting-screw S, that works in the pendent lug $e'$ of the arm of the shade-bracket E.

As shown in Fig. 4, the incandescing bodies B are simply hung from one loop, $g$, of an S-holder, H, the other loop, $g'$, being secured between the jaws of a clamp, C, attached to the outer end of the arm $d'$ of the standard D.

Instead of making the standard of wire, it may be struck from sheet metal, or it may be made of cast metal. For burners devoid of shade-brackets the construction of support shown in Figs. 5 and 7 will be found to answer the purposes admirably.

The support D is made of sheet metal, the standard $d$ being bent in U form, the leg D' of which terminates in a right-angled disk, $D^2$, adapted to fit over the burner-pipe F, and set on or be attached to a sleeve, E', which is adapted for vertical adjustment on the burner or burner-pipe by means of a thumb or set screw, S', the horizontal adjustment of the holder H being effected by means of a thumb or set screw, S, that passes through and works in both legs of the standard D. The upper end of the standard is split to form two arms, $d'$, the outer ends of which have suspension lugs or pivots $d^2$, said arms being bent at right angles, or nearly so, to the standard in opposite directions, and extend to the lugs $h'$ of the holder, their lugs $d^2$ passing through the perforations of said lugs.

Instead of splitting the standard D, as in Fig. 5, arms $d'$ $d'$ may be soldered or otherwise connected to the U-shaped portion of the standard, as in Fig. 7.

For annular burners with a plurality of jets, as an Argand burner, or for burners with a plurality of concentric jets, I prefer to employ an annular holder, H, the central aperture of which may be screw-threaded to adapt it for adjustment upon a correspondingly-threaded standard or support, D; or said holder may be provided with a nut or threaded boss, H', by means of which and a suitable key the said holder may be adjusted toward or from the flame of the burner, as may be required, as shown in Fig. 6, in which the support D for the holder consists of a screw-threaded standard, $d$, which in this case supports a holder, H, having a number of incandescing bodies, B, radiating from the periphery of said holder, which bodies, when they become heated, will bend or dip into the flame of the Argand burner A. The same will be the case with the holder shown in Fig. 3, where the dip of the needles is indicated in dotted lines.

In Fig. 9 I have shown an annular holder, H, from which the incandescing bodies B depend, such a holder being adapted for burners having a series of concentric jets. It is provided with a central aperture, $H^2$, over which is placed a chimney, I, to promote the combustion of the gas. The support D for said holder is substantially like that shown in Figs. 5 and 7, and may be of any other desired form.

In Fig. 8 I have illustrated a rectangular holder from which the incandescing bodies B depend, and which is adapted for use with burners arranged in a row, one of said holders extending over any desired number of burners. The support D for these holders is also substantially like those shown in Figs. 5 and 7. For store-windows, for example, the holders may be suspended from vertically and horizontally adjustable standards secured to some fixed portion of the window.

In Fig. 7ª I have shown a double holder, H, for burners arranged in two parallel rows or for two burners arranged side by side, the support D therefor being also constructed substantially like that shown in Figs. 5 and 7, though any other suitable support constructed for vertical and horizontal adjustment above the burner and relatively to the flame may be employed.

The vertical adjustment of the support on the burner-pipe may also be varied. Instead of securing the support D or shade-bracket in position by means of set-screw S', the burner-pipe F may be screw-threaded, and the connecting device of the support D or the bracket E with said burner-pipe may be correspondingly threaded to adapt said support or bracket to be screwed up or down on said burner-pipe. The sleeve that connects the shade-bracket E or the support D with the burner F may also be provided with a longitudinal groove, $e^3$, and to the burner-pipe may be secured a spring, $f$, that will enter into said groove and lock the sleeve to the pipe, and in addition thereto a set-screw, S', may be used; or the pipe or sleeve may be screw-threaded, as above described, and the adjustment effected by screwing the sleeve E' up or down the spring $f$, locking the same into position.

It is evident that with all the forms of supports described the holder is supported rigidly, as the arms $d'$ $d'$ thereof may be bent so as to exert sufficient power laterally to effect this, as in Figs. 1, 2, and 5, while the holders in Figs. 3 and 4 are clamped to the support, and in Fig. 6 said holder is screwed upon its support.

As the refractory substances employed to produce the light by incandescence are more or less volatile in the intense heat, it is necessary to replace them from time to time. It is obvious that some such arrangement of devices should be made for readily removing the exhausted holders and replacing them by fresh ones.

I claim—

1. The combination, substantially as herein described, of a gas-burner, an incandescing body, and means, substantially such as described, for holding or suspending said body above the burner and for adjusting the body vertically and horizontally relatively to the burner.

2. The combination, substantially as herein described, of a gas-burner, an incandescing body, and means for holding or suspending said body above the burner and adjusting the same vertically and horizontally relatively to the burner, consisting of a standard, D, to one end of which the body is connected, the opposite end thereof being constructed for connection with and vertical adjustment on the burner-pipe, and means, substantially as shown and described, for adjusting the standard in a direction at right angles to the vertical axis of said burner.

3. The combination, substantially as herein described, of a gas-burner, an incandescing body, a shade-bracket adjustable vertically on the burner, a support to hold the incandescing body above the burner, and means for connecting the support with the shade-bracket and adjusting the same horizontally thereon.

In testimony whereof I affix my signature in presence of two witnesses.

OTTO BERNHARD FAHNEHJELM.

Witnesses:
    F. VOGELER,
    J. GRUND.